(12) United States Patent
Ramamoorthy et al.

(10) Patent No.: US 9,322,948 B2
(45) Date of Patent: Apr. 26, 2016

(54) METHOD OF DETERMINING A FORMATION PARAMETER

(75) Inventors: Raghu Ramamoorthy, Pune (IN); Edward Alan Clerke, Dhahran (SA)

(73) Assignees: Schlumberger Technology Corporation, Sugar Land, TX (US); Saudi Aramco Oil Company, Dhahran (SA)

( * ) Notice: Subject to any disclaimer, the term of this patent is extended or adjusted under 35 U.S.C. 154(b) by 443 days.

(21) Appl. No.: 13/414,302

(22) Filed: Mar. 7, 2012

(65) Prior Publication Data
US 2013/0233619 A1    Sep. 12, 2013

(51) Int. Cl.
*E21B 47/00*    (2012.01)
*G01V 5/04*    (2006.01)

(52) U.S. Cl.
CPC .......................... *G01V 5/04* (2013.01)

(58) Field of Classification Search
USPC ........................................................ 175/50
See application file for complete search history.

(56) References Cited

U.S. PATENT DOCUMENTS

| | | |
|---|---|---|
| 3,562,523 A | 2/1971 | Wyman et al. |
| 3,748,474 A | 7/1973 | Murphy |
| RE28,963 E | 9/1976 | Fertl et al. |
| 4,987,368 A | 1/1991 | Vinegar |
| 5,796,252 A | 8/1998 | Kleinberg et al. |
| 7,966,875 B2 * | 6/2011 | Proett et al. ................. 73/152.22 |

OTHER PUBLICATIONS

Horkowitz, et al., "Residual Oil Saturation Measurements in Carbonates With Pulsed NMR Logs", SPWLA Journal, vol. 38 (2), Mar.-Apr. 1997, 11 pages.
Crowe, et al., "Measuring Residual Oil Saturation in West Texas Using NMR", SPWLA 38th Annual Logging Symposium, Jun. 15-18, 1997, 12 pages.
Horkowitz et al., "Residual Oil Saturation Measurements in Carbonates with Pulsed NMR Logs", SPWLA 36th Logging Symposium, Jun. 26-29, 1995, 12 pages.

* cited by examiner

*Primary Examiner* — William P Neuder
(74) *Attorney, Agent, or Firm* — James L. Kurka

(57) ABSTRACT

A method of measuring a formation parameter in the process of drilling a well penetrating the rock formation is disclosed. A section of the well is provided with a drill string comprising a drilling bit at its distal end; a first fluid is circulated through the drilling bit and invades the rock formation; a formation evaluation tool mounted onto the drill string is used to measure the formation parameter; the formation parameter is used to select the time at which a second fluid is circulated through the drilling bit; such that the second fluid alters the response of the rock formation to the formation evaluation tool; the second fluid is circulated through the drilling bit to start invading the formation; and the formation evaluation tool is used to repeat the measure of the formation parameter while circulating the second fluid.

10 Claims, 6 Drawing Sheets

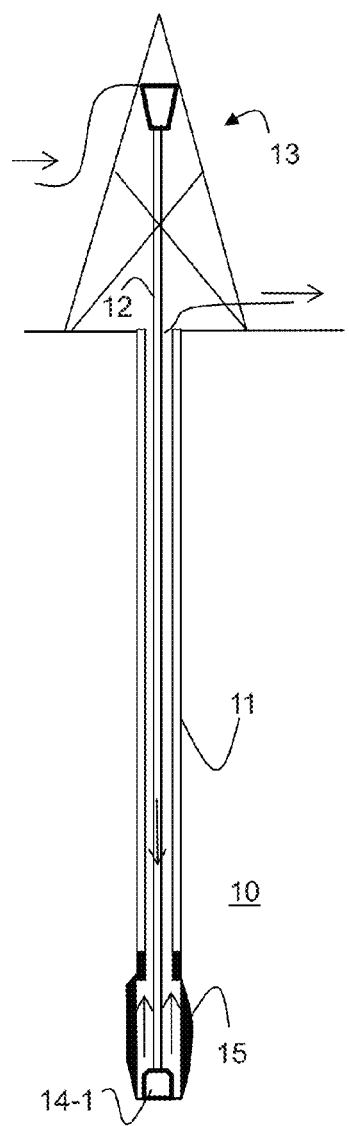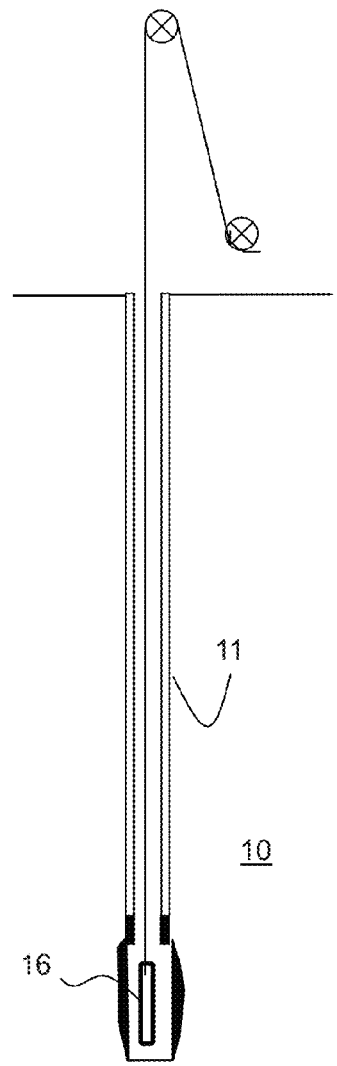
Fig. 1A
(Prior Art)
Fig. 1B
(Prior Art)

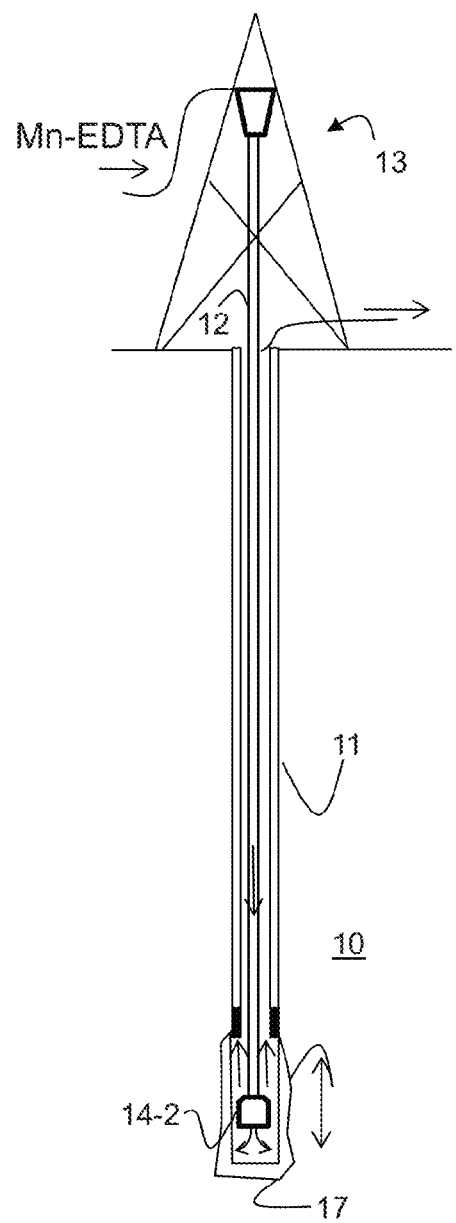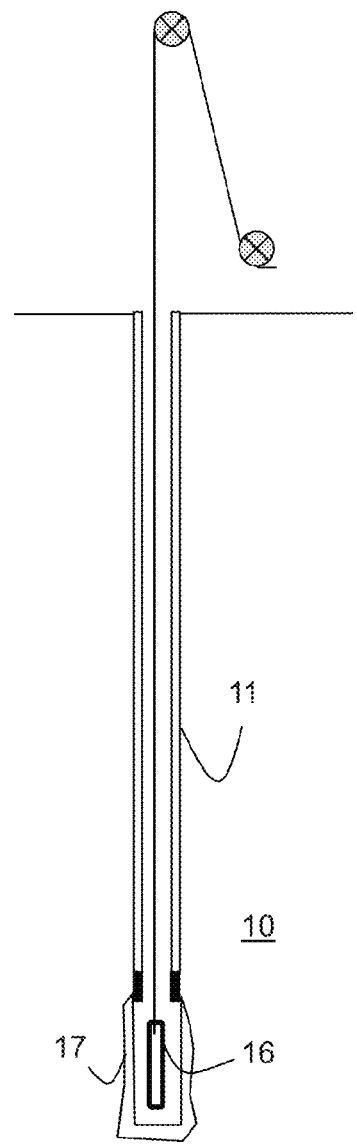
Fig. 1C
(Prior Art)
Fig. 1D
(Prior Art)

METHOD OF DETERMINING A FORMATION PARAMETER

FIELD OF THE INVENTION

The invention relates to methods of determining parameters relevant to the formation properties or formation fluid properties of subterranean reservoirs, particularly hydrocarbon reservoirs. More specifically, the invention relates to an improved method of logging with different fluids known in the art as log-inject-log procedures.

BACKGROUND

In the course of assessing and producing hydrocarbon bearing formation and reservoirs, it is helpful to acquire knowledge of formation and/or formation fluid properties which influence the productivity and yield from the formation drilled. Such knowledge might be acquired by methods referred to as "logging."

In general, logging operations involve the measurement of a formation parameter or of a formation fluid parameter as a function of location or, more specifically, as a function of borehole depth. Formation logging has evolved to encompass many different types of measurements including measurements based on sonic, electro-magnetic or resistivity measurements and nuclear measurements such as nuclear magnetic resonance or neutron capture or scattering effects.

It is further well established to mount the measurement tools for a logging operation on either dedicated conveyance means such as wireline cables, drill pipe or coiled tubing (CT) or on the drilling string. The latter case is known in the industry as measurement-while-drilling (MWD) or logging-while-drilling (LWD). In MWD and LWD operations the parameter of interest is measured by instruments that might be mounted close behind the bit or the bottom-hole assembly (BHA). Both, logging in general and LWD are techniques known for decades and hence are believed to require no further introduction.

Also known for as many as three decades are measurements broadly referred to as log-inject-log or LIL measurements. From their inception as exemplified by the U.S. Pat. No. 3,562,523 issued to Richardson and Wyman, LIL based methods have evolved to many variants.

However, the basic principle of LIL can still be seen as including a sequence starting with using a first drilling fluid system, which invades the formation over a time period and then logging the invaded formation for a desired parameter. Subsequently, the composition of the drilling fluid might be changed and this new fluid is circulated. After the new fluid has invaded the rock formation, the logging operation is repeated. The second measurement thus registers the change in the value or spatial distribution of parameter in question after a specified or an arbitrary elapsed time.

Known variants of the LIL methods are described for example in the U.S. Pat. No. 3,748,474 to Murphy, the U.S. patent RE 28,963 to Fertl and Reynolds and in the U.S. Pat. No. 4,987,368 to Vinegar. Further reference to LIL can be found in the U.S. Pat. No. 5,796,252 to Kleinberg et al. The latter document provides further insight into and details of state-of-the-art NMR logging.

In view of the above known art, it is proposed to present a method of logging a formation which improves upon the fixed elapsed time method and solves problems associated with the known log-inject-log methods.

SUMMARY

In one aspect, it is proposed a method of measuring a formation parameter of a rock formation in the process of drilling a well penetrating the rock formation. A section of the well is provided with a drill string comprising a drilling bit at its distal end; a first fluid is circulated through the drilling bit and invades the rock formation surrounding the well; a formation evaluation tool mounted onto the drill string is used to measure the formation parameter; the formation parameter measured successively over a time period is used to select the time at which a second fluid is started to circulate through the drilling bit; such that the second fluid alters the response of the rock formation to the formation evaluation tool; the second fluid is circulated through the drilling bit to start invading the formation surrounding the well; and the formation evaluation tool is used to repeat the measure of the formation parameter over a time period while circulating the second fluid.

According to a second aspect, it is proposed a method of measuring a rock formation parameter where a section of a well is drilled penetrating the rock formation using a first drilling fluid composition; the rock formation parameter is measured while drilling; the residuals of the first drilling fluid from the wall of the section are removed; and the measuring of the rock formation parameter is repeated while circulating a second fluid, comprising a component selectively miscible with either hydrocarbon or water, to invade the wall of the section.

One aspect of the method can be seen as providing variants of the known log-inject-log method in that it makes use of a second fluid that may be circulated from the surface through the drill string to invade permeable sections of the formation. Yet in contrast to the known LIL methods, the present method has an advantage in that the time for rigging up a wireline logging tool might not be required and thus the amount of idle rig time might be reduced resulting in potential savings for the drilling operator. Another aspect of the method provides the fact that the formation parameters might be measured in continuous time series during second fluid circulation and invasion.

Letting the second fluid invade the wall of the section of the well might be facilitated by removing residuals caused by deposition of the first fluid. This first fluid might be the drilling mud for drilling the well. An example of the residuals is a layer or layers of solid components of the drilling fluid (filter cake) which are left on the face of formation while the fluid components invade the formation. This filter cake can block the second fluid from invading the formation. Another example of residuals to be removed can be an appropriate layer (on the order of few millimeters) of the section itself that has been exposed to invasion of the first fluid.

Removing residuals or filter cake from the wall of the well can include various operations ranging from exercising a scraping action with either a dedicated tool or the drill bit itself to re-drilling the section to an extended diameter. A scraping action can be for example achieved by moving the drill string up and down in the drilled well; the tool or drill bit scrapes along the wall thus removing the residuals. The drilling to an extended diameter involves the use of an underreamer or a second, larger drill bit.

When willing to repeat the measurement using the second fluid on a rock face stripped of the filter cake created by the first drilling fluid, in one aspect of the method, it might be proposed to drill out the concerned section to larger diameter. By drilling with a larger diameter drill bit or alternatively, using an underreamer it is possible to remove the filter cake layer but also at least part of the formation layer previously invaded by the first drilling fluid.

In one embodiment of the method, the drill string comprises a tubular device with a drill bit at its distal end and an opening to circulate a fluid between the surface and the drill bit. Other than the standard drill string as being assembled from separate drill pipe stands, a drill string may also be a continuous or CT drill string or a drill string assembled from casing pipes.

As mentioned above, the first drilling fluid might be a drilling fluid or mud which is optimized for drilling the well. The second fluid might be optimized to alter the response of the formation to the measuring tool. It can therefore be regarded as a carrier of the component which is used to induce a change in the measured parameter, its respective spatial distribution, or both. The exact nature of this component and the overall composition of the second fluid are tuned to the parameter to be measured by the tool and the environment in which the measurement is performed.

In an embodiment, the component comprises a paramagnetic material altering the relaxing of the induced protons' aligned magnetic fields and miscible with the selected formation fluid. Possible, such paramagnetic material might include manganese (Mn) or chromium. Alternatively, the component might comprise chlorine which would alter the thermal neutron capture cross-section of the formation.

In some embodiments, the parameters of interest can be any which can be affected by the invasion of a miscible or immiscible component of the drilling fluid which effects a measurable change on the total or a phase of the formation fluid through the material transport or diffusion by invaded fluid or upon the total or portions of the rock property. Examples of which comprise nuclear magnetic resonance (NMR), the matrix thermal neutron capture cross-section (sigma) or the gamma ray scattering, photoelectric absorption, gamma ray emission of formation elements, carbon/oxygen ratio. In an embodiment, the parameter of interest is a relaxation time of protons within the pore space of the formation, in particular the spin-spin relaxation time, which for the purpose of well logging is often referred to as T2 time or distribution.

Depending on the above parameters, the formation evaluation tools can be selected from the ones providing NMR, photoelectric absorption, gamma-gamma density, sigma or neutron slowing down, natural or induced gamma rays measurements. In an embodiment, the tool is a magnetic resonance tool in combination with a real-time data transmission apparatus for downhole-surface communication mounted on the drill string. Examples of such an LWD tool are commercially available for example under the trademark proVISION from Schlumberger.

In another embodiment, the formation evaluation tool is used to monitor the invasion of the component which induces a change in the measured parameter through a time series of measurements. In a variant, the measured time series of the parameter is used to determine a control parameter, as may be a termination or stop condition for the circulation of the second fluid. In a second variant, the measured time series of the parameter is used to determine a rate of formation modification indicative of a formation property like phase dependent permeability, spontaneous imbibition, fluid phase connectedness as in residual oil phase connectedness or diffusion rate.

By directly monitoring the invasion of the circulated second fluid, the operator is given the information required for a decision on terminating circulating the second fluid. Prior log-inject-log methods had to rely on estimates when terminating this task. The stepwise monitoring of the second fluid invasion may yield further beneficial information about permeability and other rock parameters.

In another variant, it is envisaged that either the measurement sensor mounted at the distal end of the drill string or a second dedicated sensor is used to monitor the second mud as it passes through the drill string and out the end. Such monitoring can confirm that the required concentration of the component intended to alter the formation fluid property is being delivered to the formation face.

Further details and examples will be described below referring to the following drawings:

BRIEF DESCRIPTION OF THE FIGURES

FIGS. 1A-1D illustrate a conventional Log-Inject-Log operation;

DETAILED DESCRIPTION

The following description provides various embodiments, and is not intended to limit the scope, applicability, or configuration of the disclosure. Rather, the following description of the various embodiments will provide those skilled in the art with an enabling description for implementing one or more various embodiments. It being understood that changes may be made in the function and arrangement of elements without departing from the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in detail. In other instances, well-known processes, structures and techniques may be shown without detail in order to avoid obscuring the embodiments. Further, like reference numbers and designations in the various drawings indicate like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the tasks may be stored in a machine readable medium. A processor(s) may perform the tasks.

Figure 1E:
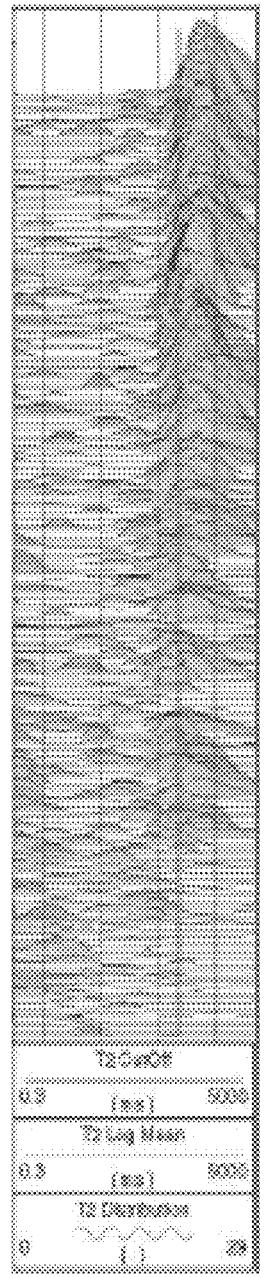
FIGS. 1E-1F illustrate NMR data as acquired by an operation in accordance with the above operation.
Figure 2A:
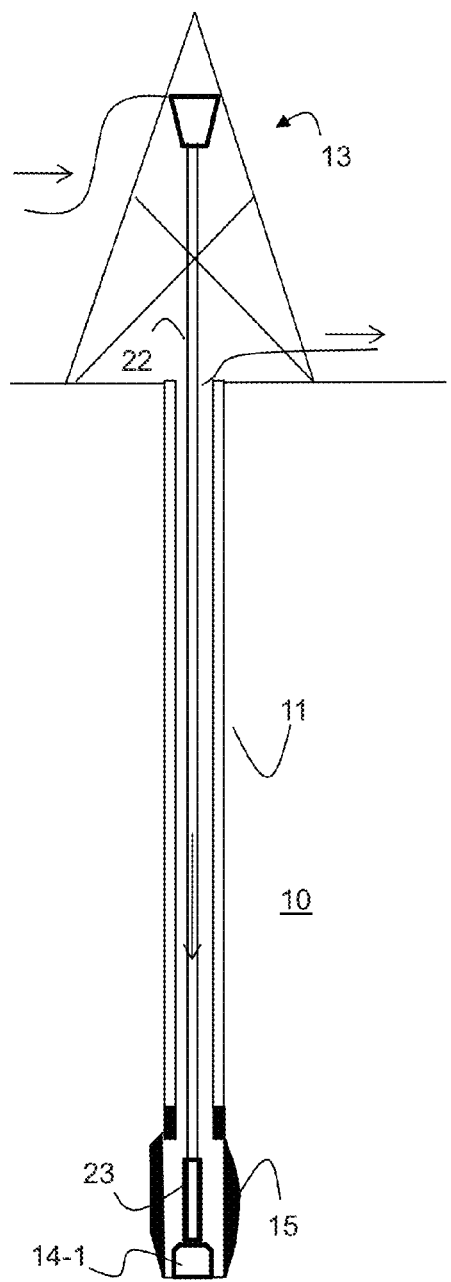
FIGS. 2A,B illustrate of a Log-Inject-Log in accordance with one example of the present method.
Figure 2B:
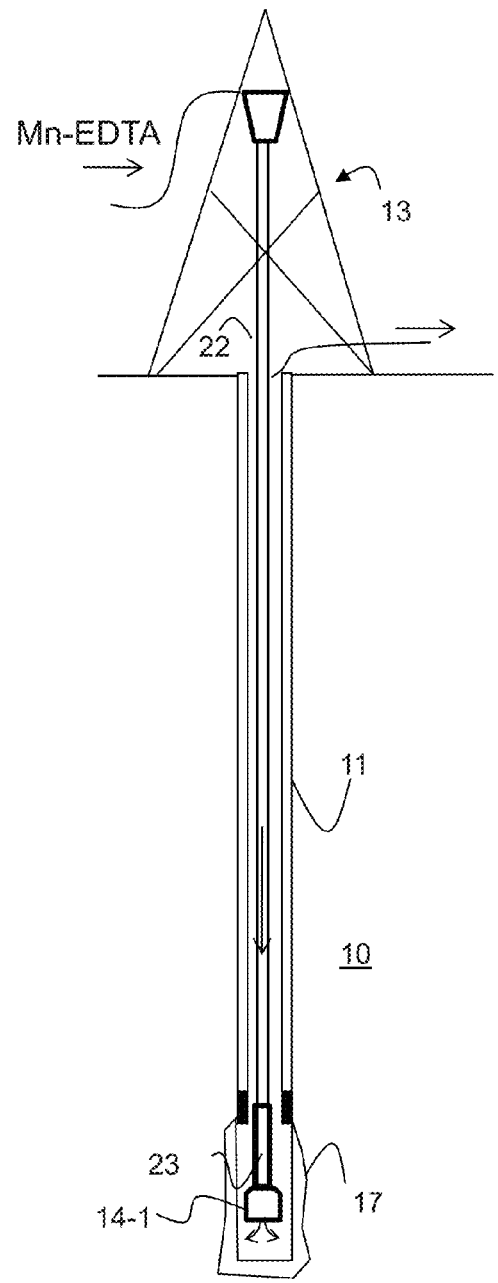

To fully understand and appreciate the details of the present invention and its advantages compared to the known variants of LIL methods, an example of the known method will be described making reference to FIGS. 1A-1D and compared to an example of the present invention (FIGS. 2A-2B).

In FIG. 1A, a well 11 is shown in the process of being drilled through a formation 10. A drill string 12 is suspended from the surface by means of a drilling rig 13. A drill bit 14-1 is attached to the bottom end of the drill string 12.

While drilling, a drilling fluid is circulated through the drill string 12 and the drill bit 14-1 to return to the surface via the annulus between the wall of the well 11 and the drill string 12. During this process, part of the drilling fluid invades a shallow zone 15 around the borehole 11. After a section of well has been drilled, the drill string 12 is lifted from the well. For illustrating the LIL operation it is assumed that this original borehole is drilled slightly under gauge, for example by drilling a 7.5 in hole in anticipation of a full gauge 8.5 in well.

After the drilling the drill string is pulled from the well, a wireline tool 16 as shown in FIG. 1B is lowered into the well 11 using a wireline cable 17. This first run of the wireline tool 16 is deployed to conduct a baseline measurement for comparison with the measurement to follow.

After the baseline measurement, the drill string 12 is lowered again into the well 11 as illustrated in FIG. 1C using the same reference numerals for identical or similar elements as in FIG. 1A. At this drilling part, a larger drill bit 14-2 with the true nominal borehole diameter of 10 inches is attached to the drill string 12. On the section drilled during the above first deployment, the new drill bit removes a small layer from the wall of the borehole 11 including any filter cake and invaded layers 15 which may have been exposed or contaminated by the drilling mud fines used during the first drilling task. If this can be achieved, the second fluid as circulated during this second drilling operation invades formation rock.

The second drilling fluid can be a standard drilling fluid modified however by adding a dopant. The dopant is a component that provides an effect on the measurement as performed by the logging tool. It might be chosen to be phase selective, so as to migrate predominantly into either the water phase or the hydrocarbon phase within the connate formation fluids.

Taking for example the case of a magnetic resonance measurement to determine the remaining oil saturation (ROS) of the formation, the additive or dopant of choice can be a paramagnetic material which dominates the magnetic interaction within the selected phase. The paramagnetic material which might be used for the above purpose is manganese applied as a salt, e.g., manganese chloride (MnCl2), or an aqueous solution of manganese complexed with ethylene diamine tetraacetate (Mn-EDTA). The latter might be advantageous for sandstone formations.

As both, MnCl2 and Mn-EDTA reduce the T2 measurement for protons in the water phase but leave the measurement in the oil phase mostly unchanged, a second run of the logging measurement provides a measurement dominated by the oil phase i.e., the remaining oil saturation (ROS) parameter. The zone 17 in FIG. 1C indicates the freshly invaded layer around the extended borehole 11.

This second run of logging measurements is illustrated in FIG. 1D. The reference numerals for equivalent elements in this drawing are the same as in FIG. 1B above. After the second logging, the drilling fluid can be switched back to the standard composition, i.e., lacking the paramagnetic additive or dopant. In case a LIL operation is planned for the next section of the well 11, a drill bit with a reduced gauge 14-1 is mounted on the drill string 12, otherwise it is possible to continue drilling with the full gauge bit 14-2, once the wireline tool 16 has been retrieved.

Figure 1F:
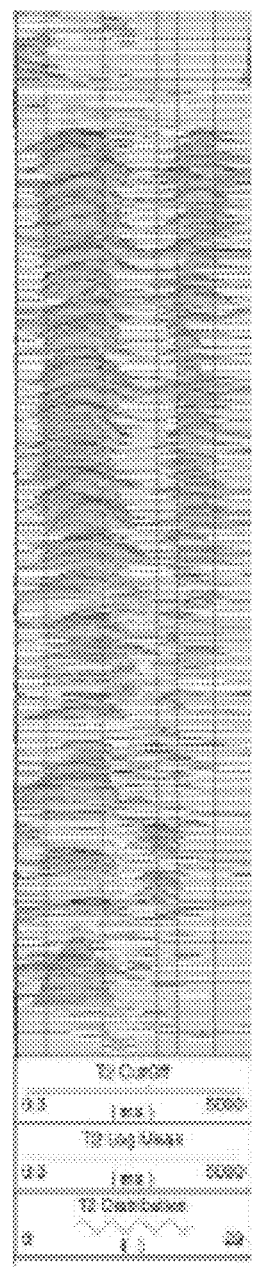

Examples of T2 logs as measured with Schlumberger's CMR wireline tool before and after circulating the dopant are shown in FIGS. 1E and 1F, respectively, demonstrating how the signal from the different phase splits in the presence of the paramagnetic dopant in one of the phases.

Assuming the total porosity is the same for both logs, the difference created by the dopant is fluid porosity relaxing at long T2 times. Assuming further that the fluid porosity relaxing at long T2 times after doping represents remaining oil, the remaining oil saturation can be calculated using the following equation (applying first the T2 cutoff):

$$ROS = Voilr/PHIT \qquad [1]$$

where: ROS=Remaining oil Saturation; Voilr=Volume of remaining oil and PHIT=Total porosity. The NMR porosity of the residual oil can be corrected for its hydrogen index, which can be determined from the oil composition.

The details of the measurements and calculations, which apply to the known methods and the new methods to be described below, can be found for example in: Edward Clerke, Donald E. Hartman, John P., Horkowitz, Pennzoil Corporation, George R. Coates, Numar Corporation, Harold J. Vinegar, Shell Development Co., SPWLA Journal 1997, Vol 38, No 2 A2.

And in Horkowitz, J. P., Vinegar, H. J., Hartman, D. E., Coates, G. R., Clerke, E. A., 1995, "Residual Oil Saturation Measurements in Carbonates with Pulsed NMR Logs," SPWLA 36th Logging Symposium, June, 1995 and in: Crowe, M. B., Jasek, D. E., Van Dalen S. C., LaTorraca, G. A., Dunn, K. J., Donovan, M. T., 1997, "Measuring Residual Oil Saturation in West Texas using NMR," SPWLA 38th Logging Symposium, June, 1997.

The above illustrated practice of an LIL operation demonstrates that such an operation can be both time and cost consuming. Hence the following embodiment in accordance with the present invention seeks to present a faster method to achieve similar results.

In accordance with an embodiment of the invention, FIG. 2A shows the well 11 of FIG. 1A. The drill string 22 is now modified compared to the one used in the example of FIGS. 1A-1D to include a LWD module 23 to perform measurements during the drilling of the well 11. As the LWD technology is well evolved, it is possible for the purpose of the description to refer to known LWD tool such as the Schlumberger proVISON™ tool. When integrated into the package as LWD tool, the proVISON can be used to measure the T2 distribution similar to the data as shown in FIGS. 1E and 1F and transmit the measurements to the surface.

The first part of the example as shown in FIG. 2A can be regarded as conventional LWD operation with the proVISON tool 23 monitoring the formation surrounding the borehole 11 while drilling. This initial measurement can be used as baseline measurement.

Subsequent to drilling the section the drill pipe is traversed across the drilled section and the measurements recorded once again in order to measure the formation subsequent to invasion of the first drilling mud. The measurement pass after drilling permits sufficient time for the invasion to have occurred After a section is drilled and logged, the drilling operator can switch the drilling fluid to a fluid including Mn-EDTA or Mn—Cl2 as additive as shown in FIG. 2B. The change to the second fluid may be based on reaching a predetermined depth or can be based on an evaluation of the LWD data as transmitted to the surface.

Once the second fluid system is circulated, the LIL process can be continued using, for example, an underreamer, which follows an under gauge drill bit (not shown) or, as shown in the example of FIG. 2B, by moving the full gage drill bit 14-2 in a manner which removes the filter cake from the drilled section of the borehole 11. The second fluid and hence the dopant Mn-EDTA or Mn—Cl2 can then invade the formation 10.

During the circulation and invasion into the formation of the second fluid, the LWD tool is used to make continuous or essentially continuous measurements. A series of such measurements is schematically illustrated in the series of plots of FIGS. 3A-3D.

Figure 3A:
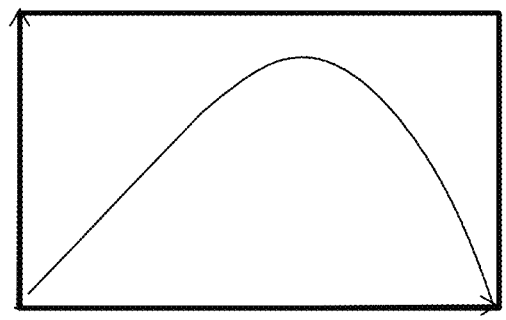
FIGS. 3A-3D show a schematic time series of an NMR measurement in accordance with one example of the present method.

The plot of FIG. 3A shows the baseline measurements of a T2 distribution at an arbitrary depth. The peaks of the protons in the oil and water phase, respectively, are overlapping.

Figure 3B:
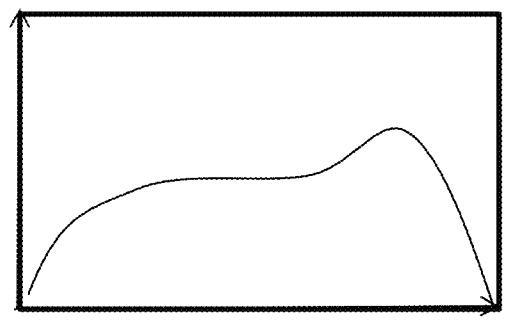

As the invasion of the formation with the second, Mn-EDTA or Mn—Cl2 doped fluid progresses, the T2 distribution of the water phase moves to increasingly shorter times as illustrated in the FIGS. 3B and 3C for two later points in times. As the volume of investigation as determined by the tool parameters remains the same at the different measurement times, the integral signal of the measured distribution curve remains constant. Hence, once the water phase peak and the oil phase peak in the T2 spectrum can be separated as shown in FIG. 3C, the oil saturation and water saturation can be easily calculated.

Figure 3C:
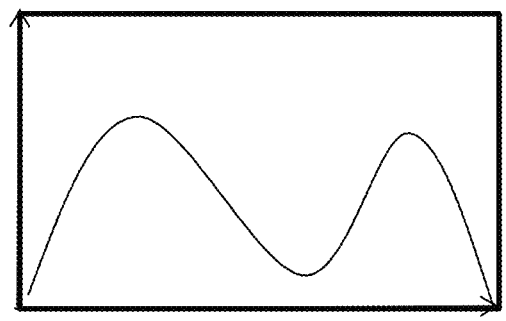
Figure 3D:
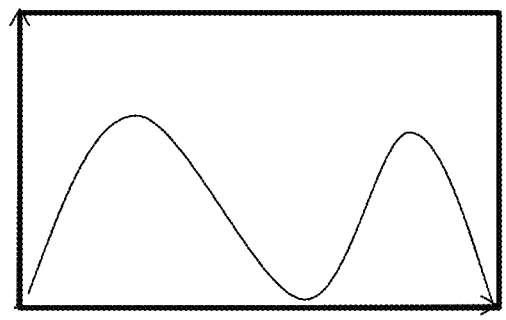

The difference between the plot of FIG. 3C and the subsequent measurement of FIG. 3D is negligible, thus indicating that the invasion process of the dopant within the volume of investigation of the LWD tool is completed. The monitoring of the progressive stages of the invasion gives the driller a signal that the circulation of the doped fluid system can be stopped and normal drilling with the conventional drilling fluid resumed.

Figure 4:
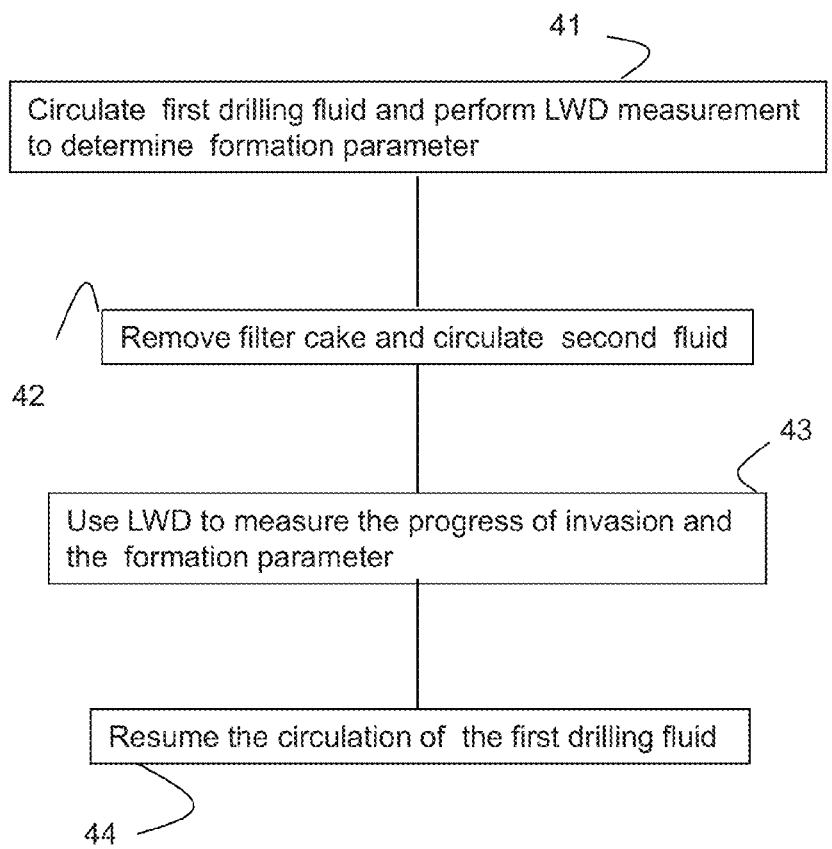
FIG. 4 is a flow diagram in accordance with one example of the present method.

The above operations of circulating a first drilling fluid and perform LWD measurement to determine formation parameter (41), and remove the filter cake and circulating a second fluid (42), while using LWD to measure the progress of invasion and the formation parameter (43) are shown in FIG. 4. After these operations have proceeded, it might be possible in some embodiments, for the normal drilling operation to resume (44).

It is worth noting that the novel method has the potential to yield results similar to that known as LIL methods with a reduced time which otherwise would be spend tripping the tool in and out of the well. Another advantage is the possibility to monitor the progress of the dopant invasion. Insufficient dopant invasion has been identified as a cause of unsuccessful LIL operations in the past.

Another advantage of the invention is in the case of multimodal carbonate pore systems (Clerke et al. GeoArabia 2008 and Clerke SPE Journal 2009 and SPE 105259) in that residual oil could be present either/or in the macropores or micropores separately or both. The presence of the residual oil impairs the brine permeability in either pore subsystem through the process of relative permeability and the time lapse measurement of the suppression of the aqueous signal by the increasing presence of the paramagnetic ions as it diffuses or invades into the aqueous phase of each pore subsystem gives information about the volume and connectedness of said aqueous phase in each pore system and the pore subsystem hydrocarbon presence thereby.

The above examples can be varied in a number of ways, for example by including a device to measure the dopant within the drill string. Thus it would be possible to monitor the amount of dopant in the second drilling fluid just before this fluid is released through the drill bit into the well.

While the invention is described through the above embodiments, it will be understood by those of ordinary skill in the art that modification to and variation of the illustrated embodiments may be made without departing from the inventive concepts herein disclosed. Moreover, while various embodiments are described in connection with various illustrative structures, one skilled in the art will recognize that the system may be embodied using a variety of specific structures. Accordingly, the invention should not be viewed as limited except as provided in the appended claims.

What is claimed is:

1. A method of measuring a formation parameter of a rock formation in the process of drilling a well penetrating the rock formation, comprising:
    providing a section of the well with a drill string comprising a drilling bit at a distal end of the drill string;
    circulating a first fluid through the drilling bit, said first fluid invading the rock formation surrounding the well;
    using a formation evaluation tool mounted onto the drill string to measure the formation parameter;
    selecting a time at which a second fluid is started to circulate through the drilling bit, such that the second fluid alters a response of the rock formation to the formation evaluation tool;
    circulating the second fluid through the drilling bit to start invading the formation surrounding the well; and
    using the formation evaluation tool to re-measure said formation parameter while circulating said second fluid.

2. A method in accordance with claim 1, further comprising removing layers from a wall of a section prior to circulating the second fluid.

3. A method in accordance with claim 1, wherein the rock formation includes hydrocarbon bearing rock.

4. A method in accordance with claim 1, wherein the formation evaluation tool is selected from a group comprising nuclear magnetic resonance tools, neutron scattering or capturing tools, sonic tools and resistivity tools.

5. A method in accordance with claim 1, wherein the first fluid is a drilling fluid.

6. A method in accordance with claim 1, wherein the second fluid comprises a component miscible with either hydrocarbon or water.

7. A method in accordance with claim 1, wherein the second fluid comprises a paramagnetic material altering the response of the rock formation to the formation evaluation tool.

8. A method in accordance with claim 7, wherein the paramagnetic material comprises manganese, chromium.

9. A method in accordance with claim 1, wherein the second fluid comprises chlorine.

10. A method in accordance with claim 1, further comprising using the formation evaluation tool to perform a time series measurement of the parameter while circulating the second fluid.

* * * * *